Nov. 10, 1964

E. J. SHAW 3,156,864

APPARATUS FOR TESTING THE INSULATION OF A PLURALITY
OF MUTUALLY INSULATED CONDUCTORS WITH MEANS FOR
APPLYING SEPARATE ALTERNATING POTENTIALS
TO EACH OF THE CONDUCTORS

Filed Dec. 20, 1960

INVENTOR
E. J. SHAW

BY Albert R. Hodges

ATTORNEY

Nov. 10, 1964   E. J. SHAW   3,156,864
APPARATUS FOR TESTING THE INSULATION OF A PLURALITY
OF MUTUALLY INSULATED CONDUCTORS WITH MEANS FOR
APPLYING SEPARATE ALTERNATING POTENTIALS
TO EACH OF THE CONDUCTORS

Filed Dec. 20, 1960   2 Sheets-Sheet 2

INVENTOR
E. J. SHAW
BY
Albert R. Hodges
ATTORNEY 3,156,864
APPARATUS FOR TESTING THE INSULATION OF A PLURALITY OF MUTUALLY INSULATED CONDUCTORS WITH MEANS FOR APPLYING SEPARATE ALTERNATING POTENTIALS TO EACH OF THE CONDUCTORS
Everett J. Shaw, Pennington, N.J., assignor to Western Electric Company, Incorporated, a corporation of New York
Filed Dec. 20, 1960, Ser. No. 77,214
9 Claims. (Cl. 324—54)

This invention relates to apparatus for testing cable, and more particularly to apparatus for testing the electrical insulation between individual conductors within a cable comprising a plurality of conductors which are normally insulated from one another.

Present equipments for testing the breakdown potential of the insulation of conductors within a cable usually require the sequential switching of test voltage to each of the conductors to be tested while the other conductors are grounded. In the event that there is a break, pinhole, electrically weak spot, or other fault in the insulation between the conductors being tested, a sparking or other current flow will occur at the point of the fault. Commonly, the fault is detected by sensing the increased current flow which results from the failure of the insulation of conductors under test. This system is cumbersome because it requires sequential switching of the test potential to each conductor. In the case of telephone communications cables, the test potentials required may be higher than can be handled by conventional communications switching systems. Special, heavy, switching equipment is therefore essential for testing such cables with present methods of testing. Furthermore, sequential switching in cables containing a large number of conductors may be time consuming and costly.

An object of this invention is to provide new and improved apparatus for testing the electrical insulation between individual conductors within a cable comprising a plurality of conductors which are normally insulated from one another.

A further object of this invention is to provide new and improved apparatus for testing the insulation in cables which substantially eliminate the need for sequentially switching test potentials to the conductors within the cable under test.

In accordance with certain aspects of the invention alternating potentials of predetermined amplitudes are applied concurrently to each of several conductors to be tested, the potentials being such as to cause opposed peaking of such potentials to occur between each conductor and each of the other conductors. Means may be provided for detecting a fault in the insulation between any of the conductors.

More specifically alternating potentials of preselected amplitudes and of different frequencies may be applied to each of the conductors within a cable to be tested so that opposed peaking occurs. In the normal heterodyning of the applied waves, peak voltages (in opposing directions relative to ground) will occur between each conductor and each of the other conductors. The amplitude of each of the applied potentials is so selected that when such peaking occurs the desired test potential exists between the pair of conductors experiencing the peak. Hence, each conductor is tested relative to each of the other conductors, rapidly, and without need for sequential switching.

It it is desired to test each of the conductors within the cable at the same potential, the amplitudes of the applied alternating potentials should be one-half the desired test potential. When opposed peaking occurs, as discussed above, the potential between conductors experiencing the peak will be twice that of the applied potentials and the desired test voltage will be present across the insulation between the conductors experiencing the peak. If it is desired to test one or more of the conductors within the cable at a different potential, the amplitude of the potential applied to such conductor(s) may be adjusted so that the desired test potential is present relative to each of the other conductors when opposed peaking occurs.

Obviously, it is possible to select combinations of frequencies which will not cause the applied potentials to peak in opposing directions, for example, where one frequency is exactly twice another. However, as a practical matter, each of the applied potentials will not be at zero amplitude at the same instant and substantial peaking will occur. Also, it is a simple matter for one skilled in the art to select frequencies which will result in opposed peaking.

Still another aspect of this invention contemplates the application of alternating potentials of preselected amplitude and of the same frequency to each of the conductors within the cable to be tested and sequential shifing of the phase or the frequency of each of the applied potentials so that opposed peaking occurs, and the detection of any electrical breakdown of the insulation of any conductor. The above discussed considerations relative to the selection of the amplitudes of the applied alternating potentials are also applicable in this case.

Apparatus illustrating certain aspects of this invention may comprise means for applying alternating potentials of preselected amplitude to each of the conductors within the cable to be tested so that opposed peaking occurs, and means for detecting the electrical breakdown of the insulation of any conductor. The means for applying alternating potentials may supply a potential of different frequency to each of the conductors. Alternatively, such means may supply alternating potentials of identical frequency wherein the phase of each such potential is sequentially shifted or the frequency is sequentially changed relative to that of each of the other conductors so that opposed peaking between each respective pair of conductors occurs.

A complete understanding of the invention may be obtained from the following detailed description of apparatus forming specific embodiments thereof, when read in conjunction with the appended drawings, in which.

Figure 1:
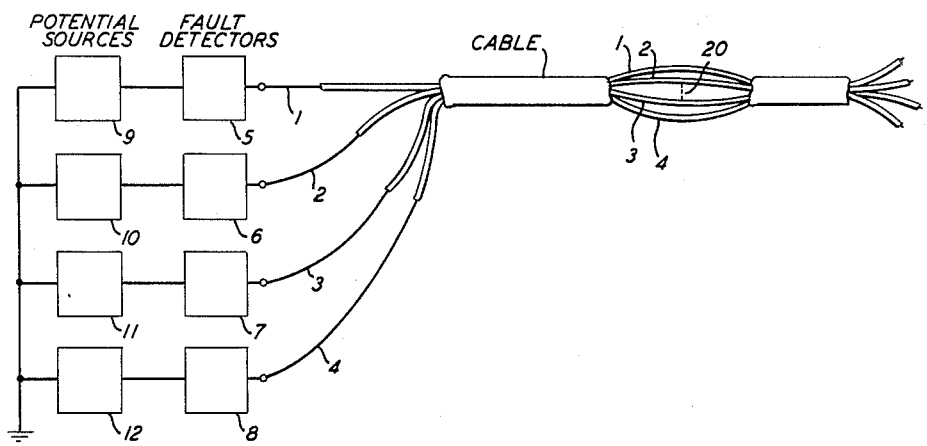
FIG. 1 is a schematic representation of apparatus suitable for practicing the invention.

FIG. 1 schematically illustrates apparatus suitable for practicing the invention to test the insulation of the conductors in a cable having insulated conductors 1–4. A four-conductor cable is chosen for explanatory purposes only, and, of course, the invention may be practiced with cables having any number of conductors. While this discussion makes particular reference to insulated conductors within a cable, it is to be understood that the test methods and apparatus herein described may be applied to any plurality of mutually insulated conductors, including uninsulated conductors within a cable, conductive sheathing, and like conductive elements. Each conductor is connected to a fault detector shown schematically as the boxes marked 5–8, respectively. The fault detectors will be discussed in detail below.

The term "fault" as used herein is intended to include many forms of electrical weakness, shorts, pinholes, breaks, insulating material having low dielectric strength, and the like. In general, this term includes electrical weaknesses of the sort detected by conventional electrical breakdown test sets for cable.

Connected to each of the fault detectors is a source of alternating potential, 9–12 respectively, each such alternating potential source, in turn, being connected to ground as shown. In the absence of any fault, the other ends of conductors 1–4 are not grounded or otherwise interconnected.

Figure 2:
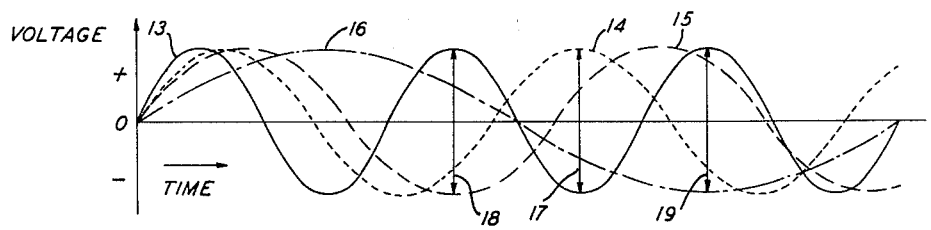
FIG. 2 is a graph showing the phase relationships of the applied alternating potentials when the invention is practiced with the apparatus shown in FIG. 1.

In operation, the potential sources 9–12 serve to supply an alternating potential of a different frequency to each of the conductors 1–4. Referring to FIG. 2 which, as indicated, is a plot of voltage against time, curve 13 represents the alternating potential applied to conductor 1; curve 14, the alternating potential applied to conductor 2; curve 15, the alternating potential applied to conductor 3; and curve 16, the alternating potential applied to conductor 4. It will be seen that the alternating potential applied to conductor 1 (curve 13) will be in opposed, peaked condition relative to the alternating potentials applied to each of the other conductors at different instants in time. Dimension arrow 17 (FIG. 2) indicates this condition relative to the alternating potential applied to conductor 2 (curve 14); dimension arrow 18 indicates this condition relative to the alternating potential applied to conductor 3 (curve 15); and dimension arrow 19 indicates this condition relative to the alternating potential applied to conductor 4 (curve 16). The lengths of dimension arrows 17–19 indicate the potential difference between conductor 1 and each of the other conductors during the conditions of opposed peaking. As shown, the amplitudes of the alternating potentials applied to the conductors are equal. Hence, during an opposed peaking condition, the applied potentials add in opposing directions and the potential difference between conductors experiencing the peak is twice the applied potential.

As discussed above, if it were desired to test the insulation of one or more of the conductors at some different potential, the amplitude of the alternating potential applied to such conductor(s) could be adjusted accordingly at its respective potential source. This feature of the apparatus under discussion is of value when the cable to be tested includes various types and sizes of conductors, the insulation of which must withstand different voltages. For example, a cable under test might include both communication and power transmitting conductors.

Although FIG. 2 illustrates the opposed peaking condition of conductor 1 (curve 13) relative to each of the other conductors, as time progresses, each conductor will experience opposed peaking relative to each of the other conductors in the cable. Hence, the insulation between each pair of conductors will be tested.

If there is no fault in the insulation between any of the conductors, the current flow through each conductor will be relatively low because substantially open circuit conditions prevail. However, if there is a fault, for example, between conductor 2 and conductor 3 at point 20 in the cable (FIG. 1), then increased current will flow in conductors 2 and 3. In the supposed example, this current will flow in pulses occurring at the beat frequency (the frequency equal in numerical value to the difference between the frequencies of the applied potentials) of the alternating potentials applied to conductors 2 and 3. Fault detectors 6 and 7 will now be affected by the changed electrical condition of conductors 2 and 3 and will indicate that a fault is present therebetween. As shown in FIG. 1, the increased current flow due to the fault between conductors 2 and 3 will be from potential sources 10 and 11, through fault detectors 6 and 7, conductors 2 and 3, and the fault.

Fault detectors 5–8 are adapted to provide a signal indicating the changed electrical condition of any conductor which results from a fault. Although numerous other arrangements for detecting faults will occur to those skilled in the art, a particularly convenient fault detector is a current-sensitive element responsive to the current flow which results from a fault between conductors. Simple current detecting devices, for example, meters, relays, and glow lamps, may be used for this purpose. The glow lamp offers a highly convenient fault detecting device because it may conveniently be arranged to glow and provide a visual signal at some minimum current flow. If the current flow due to a fault is above this minimum and the current flow in the absence of any fault is below it, the glow lamp itself will serve as a fault detector.

Figure 3:
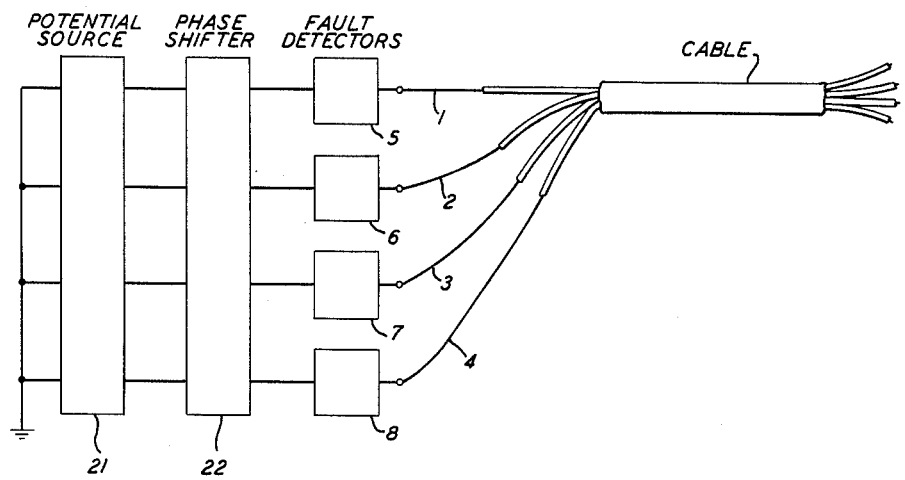
FIGS. 3 and 4 are schematic representations of alternative forms of apparatus suitable for practicing the invention.

An alternative form of apparatus suitable for the practice of the invention is illustrated schematically in FIG. 3. The illustrated apparatus is similar to that shown in FIG. 1 and includes fault detectors 5–8 connected to conductors 1–4 in the same manner as in FIG. 1. However, potential sources 9–12 have been replaced with a single source of alternating potential 21 capable of providing alternating potentials of the same frequency and at the desired amplitudes (which amplitudes will be determined in accordance with the desired test potentials as discussed above).

Interposed between potential source 21 and conductors 1–4 is a sequential phase shifter 22 which functions in a known manner to transmit the potentials provided by potential source 21 and to sequentially shift the phase of each applied potential so that opposed peaking occurs between the conductor experiencing the phase shift and each of the other conductors. It will be apparent to those skilled in the art that a sequential phase shift relative to each conductor of substantially 180° will cause the opposed peaking condition.

Phase shifter 22 may be replaced by a corresponding element which functions in a known manner to sequentially change the frequency of the applied potentials so that opposed peaking occurs between the conductor experiencing the changed frequency and each of the other conductors. The effect of using such apparatus can be understood if it be imagined that one frequency, say that corresponding to curve 13 (FIG. 2), is applied to all the conductors and, one by one, the frequency of the potential applied to each conductor is changed, say to that corresponding to curve 14. Opposed peaking will sequentially occur at points in time and potentials corresponding to dimension arrow 17.

In operation, the apparatus shown in FIG. 3 functions much like that of FIG. 1, except that phase shifter 22 distributes phase-shifted potentials or alternatively, frequency-changed potentials, to each of the conductors. In case of a fault in the insulation between conductors, the electrical condition of such conductors changes and their fault detectors will then signal accordingly.

Figure 4:
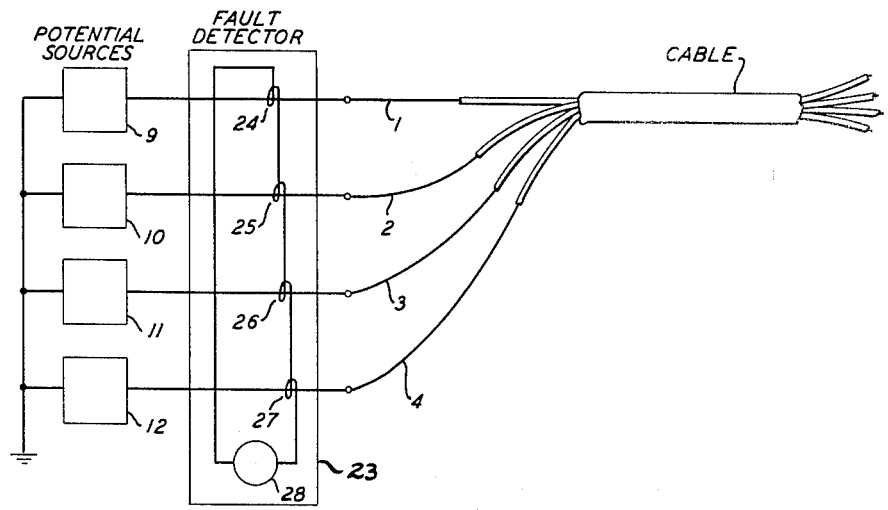

The embodiment of the invention discussed in connection with FIG. 1 involves the use of fault detectors 5–8, one fault detector being connected to each of the conductors to be tested. FIG. 4 illustrates an embodiment of the invention in which fault detectors 5–8 have been replaced by a single fault detector 23. Also, the potential sources 9–12 have been so adjusted that there is no equal difference between the frequencies of any two alternating potentials being applied, that is, the numerical difference in cycles per unit time between any two applied potentials is different from that corresponding to any other pair of applied potentials.

Fault detector 23 includes a pickup element for each of the conductors being tested. Schematically, these pickup elements are shown as series-connected pickup loops 24–27 associated respectively with conductors 1–4. In case of a fault between two conductors, there will be a transfer of current between the conductors at the beat frequency of the potentials applied to such conductors, and the two pickups associated with these conductors will be affected accordingly. Frequency indicator 28, connected in series with the pickups, will then respond by indicating the detected beat frequency.

Because the potential sources have been adjusted as indicated above, each pair of conductors has associated with it a unique beat frequency. Therefore, the beat frequency indicated by frequency indicator 28 is characteristic of only one pair of conductors. Hence, the operator of this equipment need only consult frequency indicator 28 to identify conductors having faulty insulation between them.

In order to avoid a misleading reading on frequency indicator 28 due to detection of the frequencies of the applied potentials rather than the beat frequencies, the frequency indicator may be rendered sensitive to the possible range of beat frequencies and insensitive to the range of applied frequencies in any one of many ways known to those skilled in the art.

Although particularly useful in testing multiconductor communications cables, the present invention is broadly applicable to the testing of any plurality of mutually insulated conductors where it is desirable to maintain fault-free insulation between conductors.

It is understood that the described apparatus are simply illustrative of the application of the principles of the invention. Numerous other means may be devised by those skilled in the art which will embody the principles of the invention and fall within the spirit and scope thereof.

What is claimed is:

1. Apparatus for testing the insulation of at least three mutually insulated conductors which comprises means for supplying at least three separate alternating potentials of predetermined amplitudes, means for connecting each of the conductors to be tested to a different one of said potentials, said supply means being designed for causing opposed peaking of the potential applied to one conductor relative to each of the respective potentials applied to the other conductors, and means for monitoring the electrical condition of the conductors to detect the presence of a fault in the insulation between any of the conductors.

2. Apparatus for testing the insulation of a plurality of mutually insulated conductors in accordance with claim 1, wherein the supply means for causing opposed peaking comprise means for applying an alternating potential of a different frequency to each of the conductors.

3. Apparatus for testing the insulation of a plurality of mutually insulated conductors in accordance with claim 1, wherein the supply means for causing opposed peaking comprise means for applying alternating potentials of the same frequency to each conductor and means for sequentially shifting the phase of each applied potential.

4. Apparatus for testing the insulation of a plurality of mutually insulated conductors in accordance with claim 1, wherein the supply means for causing opposed peaking comprise means for applying the same frequency to each conductor and means for sequentially changing the frequency of each applied potential.

5. Apparatus for testing the insulation of a plurality of mutually insulated conductors in accordance with claim 1, wherein the supply means for applying alternating potentials are adjustable to provide a range of amplitudes.

6. Apparatus for testing the insulation of a plurality of mutually insulated conductors in accordance with claim 1, wherein the supply means for applying alternating potentials are adjustable to provide a range of frequencies.

7. Apparatus for testing the insulation of a plurality of mutually insulated conductors in accordance with claim 1, wherein the means for monitoring electrical condition of the conductors comprise means responsive to an increased current flow resulting from a fault.

8. Apparatus for testing the insulation of three or more mutually insulated conductors, which comprises means for concurrently applying a separate alternating potential to each of the respective conductors to be tested, each of said potentials being of a predetermined amplitude and of a different frequency so as to cause opposed peaking of the potential applied to a conductor relative to the potentials applied to the other conductors, and means for detecting any fault between conductors including means responsive to the beat frequencies of the applied potentials.

9. Apparatus for testing the insulation of three or more mutually insulated conductors, which comprises means for concurrently applying a separate alternating potential to each of the conductors to be tested, each of said potentials being of a predetermined amplitude and of a different frequency so as to cause opposed peaking of the potential applied to a conductor relative to the potentials applied to the other conductors, the means for applying potentials being adapted to provide potentials at discrete frequencies such that the beat frequency of the potentials applied to any pair of conductors is unique to that pair, and means electrically coupled to the conductors for monitoring the electrical conditions of the conductors to detect a fault condition between any pair of conductors varying at the beat frequency of any two of the applied potentials.

References Cited in the file of this patent

UNITED STATES PATENTS

| | | |
|---|---|---|
| 2,522,362 | Gilbert | Sept. 12, 1950 |
| 2,746,015 | Alsberg | May 15, 1956 |

FOREIGN PATENTS

| | | |
|---|---|---|
| 51,101 | Denmark | Dec. 30, 1935 |